United States Patent Office 2,967,846
Patented Jan. 10, 1961

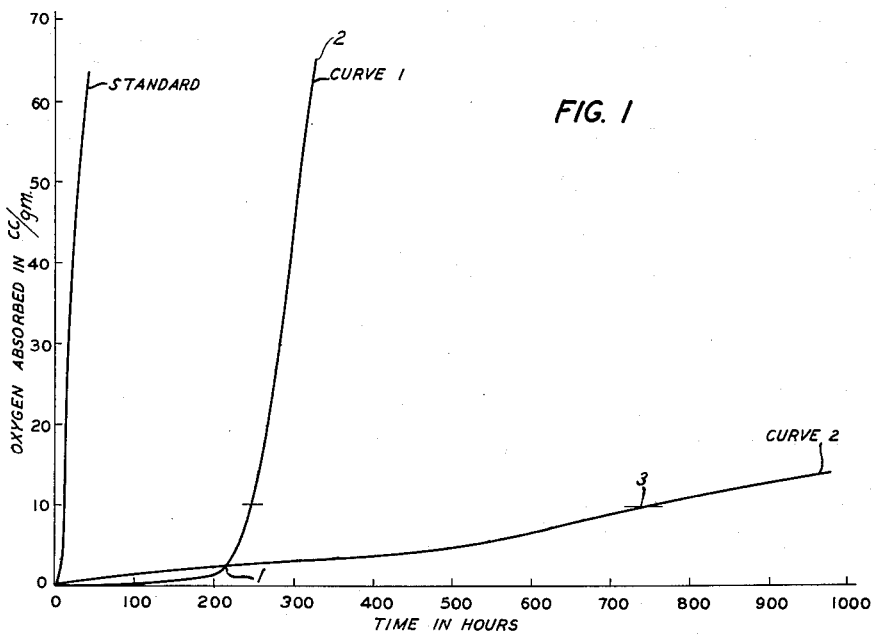
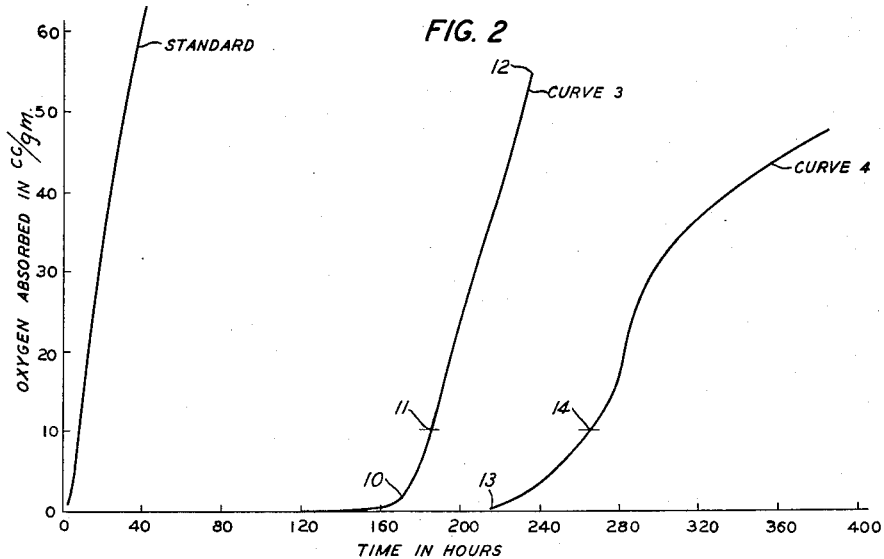
W. L. HAWKINS
INVENTORS V. L. LANZA
F. H. WINSLOW

2,967,846
ALPHA OLEFIN POLYMERS STABILIZED WITH FUSED RING SULFIDE COMPOUNDS

Walter L. Hawkins, Montclair, Vincent L. Lanza, Summit, and Field H. Winslow, Springdale, N.J., assignors to Bell Telephone Laboratories, Incorporated, New York, N.Y., a corporation of New York Filed Nov. 29, 1956, Ser. No. 625,068

10 Claims. (Cl. 260—41)

This invention relates to the stabilization of polymeric materials against oxidation by the inclusion therein of small amounts of inhibitor and to highly stabilized products so produced. This invention is primarily directed to such processes and products in which protection against oxidation taking place under the influence of ultraviolet radiation is imparted to the polymeric material by the additional inclusion therein of finely dispersed particles of carbon.

The oxidative mechanism against which protection is afforded in accordance with this invention takes place only in essentially saturated hydrocarbon polymeric materials containing tertiary hydrogen atoms and this invention is therefore restricted to compositions containing such polymeric materials. Polymers containing tertiary hydrogen atoms are of two types; those containing random numbers and spacing of tertiary hydrogen atoms such as polyethylene and those containing ordered hydrogen atoms such as polypropylene. This invention is concerned with either category of polymers containing tertiary hydrogen atoms and also with copolymers and mixtures both of which contain at least one such polymer. Examples of polymers included in this invention in addition to those named ar polybutene-1, poly(3-methyl butene-1), poly(4-methyl pentene-1), poly(4,4-dimethyl pentene-1), polydodecene-1 and poly(3-methyl pentene-1).

Some of the polymers under consideration may have as few tertiary hydrogen atoms as one for every hundred carbon atoms while others such as polypropylene may have as many as one tertiary hydrogen atom for every two carbon atoms. Although the most common polymeric materials falling within the class above outlined are the polymerization products of monomers containing four or fewer carbon atoms, polymerized products of higher order monomers may also be stabilized in accordance with this invention providing they contain tertiary hydrogen atoms as may copolymers and mixtures containing such polymers. For a discussion of the oxidative mechanism against which protection is imparted in accordance with this invention, see Modern Plastics, volume 31, pages 121 to 124, September 1953.

Some of the polymeric materials included in the class above set forth have already attained considerable commercial importance; notably, the various types of polyethylene. Some of the other materials in this class have excellent electrical and mechanical properties and will doubtless find widespread use in the near future.

Many of the most important applications of polyethylene such as its use in cable sheathings depend on its very good mechanical properties such as high tensile strength and abrasion resistance coupled with its repellent properties against water and water vapor. Other uses take advantage of its high dielectric strength in applications such primary insulation of wire conductors.

Unfortunately, however, polymeric materials such as ethylene and the others listed are subject to deterioration sunlight and heat both of which induce oxidation of the long chain polymeric structure and thereby impair tensile strength, low temperature brittleness and dielectric properties. Oxidative deterioration in the absence of ultraviolet is here referred to as "thermal oxidation" and as the term implies, the effect is substantially accelerated by an increase in temperature.

It was discovered some time ago by workers in the field that effects due to ultraviolet absorption could be effectively avoided by the incorporation into the polymer of small amounts of finely dispersed particles of carbon black. Effective light shielding from ultraviolet emission is afforded by the incorporation into the polymer of from about .05 percent to about 5 percent by weight, and usually about 3 percent, of carbon black particles of the order of somewhat less than 1000 angstroms in size. Many types of carbon black are commercially available for this purpose and their use is widespread. Any such materials are effective in combination with the retarders of this invention in producing a stabilized polymeric product.

The deleterious degradative effect of thermal oxidation on polymers such as polyethylene and polypropylene has also received considerable attention by researchers in the field. Effective "antioxidants" developed for this purpose are generally secondary amines of aromatic compounds which may, in addition to the amino grouping, contain as a ring substituent a branched or normal aliphatic radical generally containing three or more carbon atoms. As is well known, a general requirement of such antioxidants is that they contain an antioxidant group such as the secondary amino group attached to an aromatic ring, the compound having such a structure that its resulting radical is stabilized by resonance energy. Much consideration has been given such antioxidants in the texts, see, for example, G. W. Wheland's "Advanced Organic Chemistry," 2nd edition, chapters 9 and 10.

However, even though it has been known for some time that ultraviolet degradation may be effectively prevented by the use of a dispersion of carbon black particles, and even though thermal oxidative degradation may be avoided by the use of any of several antioxidants commercially available for this purpose, a further difficulty has been encountered in attempts to prepare polymeric compositions which are at the same time stabilized against both oxidative influences. In view of the knowledge that certain carbon blacks when incorporated into essentially saturated hydrocarbon polymers have a mild antioxidant effect in addition to shielding the substance against ultraviolet radiation, it was expected that the incorporation of known antioxidants into polymeric materials containing such carbon blacks would result in increased stability against thermal oxidation. It was discovered however that not only is the effect of the presence of such antioxidants and carbon black in the polymer not additive, but that the effectiveness of the antioxidant in the presence of carbon black is reduced several fold, and in many instances is rendered completely ineffectual in that such a product has no more resistance against thermal oxidative degradation than does a sample containing no thermal antioxidant whatever.

In accordance with the disclosure herein, we have discovered a class of materials which when combined with carbon black in polymeric materials, such as polyethylene, results in a stabilized product which compares favorably with polymeric materials in which have been incorporated the best commercially available antioxidants and which contain no carbon black. These materials are for the most part also effective oxidation inhibitors in polymeric materials containing no carbon black.

Although, as has been stated, the inhibitor materials of this invention are effective in clear polymeric materials, they differ from most commercially available antioxidants in that their effectiveness in the presence of carbon black in such polymeric materials is increased rather than decreased. This synergistic effect in the presence of carbon black is not completely understood by these inventors. It is probable, however, that whereas carbon black has the effect of adsorbing the active antioxidant grouping on most conventional materials, some portion or grouping of the molecule of the class of antioxidant materials reported herein is more readily adsorbed by the carbon so as to leave the active groupings free to react with an oxygenated radical. Although this would serve to explain why the antioxidants herein continue to be active agents in the presence of carbon black, this does not explain why their effectiveness is generally increased in the presence of carbon black. More attention will be given to this phenomenon further on.

The inhibitor materials of this invention are all diaryl monosulfides of the general formula Ar—S—Ar' in which Ar and Ar' are fused aromatic ring structures, such as naphthyl or anthryl containing at least one ring substituent selected from the group consisting of hydroxyl radicals and secondary amine radicals, and which may contain one or more additional ring substituents, such for example, as hydrocarbon radicals containing up to 20 carbon atoms with a proviso, however, that the total number of carbon atoms in the entire Ar or Ar' moiety including hydrocarbon substituents shall not exceed 30. In this sense, a moiety is either portion of the molecule bonded to a sulfur atom. Such compounds may include additional hydroxyl radicals and may also include additional hydrocarbon substituents providing, of course, that the total number of carbon atoms does not exceed the limit set forth.

Examples of inhibitors within the scope of this invention are:

2,2'-thiobis-1,1'-dihydroxynaphthalene
2,2'-thiobis-1,1'-dihydroxydimethylnaphthalene
2,2'-thiobis-1,1'-dihydroxydiethylnaphthalene
2,2'-thiobis-1,1'-dihydroxydipropylnaphthalene
2,2'-thiobis-1,1'-dihydroxydibutylnaphthalene
1,1'-thiobis-2,2'-dihydroxydimethylnaphthalene
1,1'-thiobis-2,2'-dihydroxydiethylnaphthalene
1,1'-thiobis-2,2'-dihydroxydipropylnaphthalene
1,1'-thiobis-2,2'-dihydroxydibutylnaphthalene
Thiobis (hydroxyanthracene)
Thiobis (hydroxynaphthalene)
Thiobis (dihydroxyanthracenes)
Di-N-phenyl-alpha-naphthylamine sulfide
Di-N-naphthyl-alpha-naphthylamine sulfide
Di-N-naphthyl-beta-naphthylamine sulfide
Di-N-phenyl-beta-anthrylamine sulfide
Di-N-phenyl-alpha-anthrylamine sulfide
The di-N-naphthylanthrylamine sulfides
The di-N-anthrylanthrylamine sulfides As is well known to those versed in the art, the hydroxyl radical contained as a ring substituent on the Ar or Ar' grouping is an active antioxidant grouping commonly used in nonstaining antioxidants. In accordance with conventional antioxidant chemistry the effectiveness of this active radical is increased by the phenomenon of "resonance." The active radical may be sterically hindered by one of the fused rings of the Ar or Ar' grouping or additional hindrance may be secured by the presence of an additional grouping such as a normal, branched or cyclic hydrocarbon substituent.

The advantages gained by the use of the compositions of this invention will be appreciated by reference to the following figures in which:

Fig. 1, on coordinates of oxygen absorbed against time, is plotted from data taken from an accelerated test indicating the rate of oxidation of three samples of polyethylene, one pure, one containing di(beta-naphthol)-sulfide and one sample containing di-(beta-naphthol)-sulfide and carbon black particles;

Fig. 2 on similar coordinates is a plot of the rate of oxygen absorption by three polyethylene samples, one pure, one containing phenyl-beta-naphthylamine-sulfide and one sample containing phenyl-beta-naphthylamine sulfide and carbon black.

The data represented by the curves of both Figs. 1 and 2 are taken from the standard accelerated aging test for polymeric materials. Such tests are well known and data taken therefrom is of known significance. To aid in the description of these figures, an outline of the accelerated testing procedure used is set forth below.

Accelerated test procedure

The saturated hydrocarbon polymer, which in all of the tests for which data is reported on the accompanying figure was polyethylene, together with an inhibitor and carbon black where required was prepared by mill massing on a 6-inch by 12-inch two-roll mill having roll speeds of approximately 25 and 35 r.p.m. with the rolls at a temperature of about 120° C. The polyethylene used in these studies was a commercial, high-molecular weight, high-pressure polymer supplied by the Bakelite Company as DYNK. This particular polymeric product finds widespread use in industry in such applications as cable sheathing and primary conductor insulation. Where carbon black was to be included, a master batch of polyethylene and 25 percent by weight of carbon black was first prepared by milling, after which the concentration of carbon black was cut back to about 3 percent by dilution with additional polyethylene. This procedure was followed to insure good dispersion of the carbon black throughout the polymer. In instances where the melting point of the inhibitor under study was above 255° F., the master batch also contained an amount of such inhibitor in excess of the amount to be tested. In such instances, the excess of inhibitor was proportionally equal to the excess of carbon black so that the amounts of both additives could be reduced to the desired levels by the addition of polyethylene. Where the melting point of the inhibitor was below 255° F., it was added directly in the desired concentration to the diluted mix which already contained the desired amount of carbon black, special care being taken to avoid loss of inhibitor by evaporation.

Test sheets of the polymeric material containing both the inhibitor and the carbon black were molded to a thickness of approximately 50 mils, and 14-millimeter diameter disks were cut from these sheets. Four such disks, each in a shallow glass cup, were placed in a Pyrex glass tube attached to a mercury manometer together with about 2 grams of powdered barium oxide or similar absorbent. The reaction vessel, after being successively evacuated and filled with oxygen to assure a complete oxygen environment, was again filled with oxygen and was placed in an air circulating strip-heater oven maintained at 140° C. and of such design as to assure a variation of no more than 1° C. throughout the entire volume in the oven. The reaction vessel was immediately connected to an oxygen gas burette with a short length of polyvinyl chloride tubing. After reaching temperature equilibrium at the said temperature of about 140° C., the system was adjusted to zero reading at atmospheric pressure. Readings of oxygen uptake were made as required at atmospheric pressure, one such reading being taken every 4 to 12 hours.

Referring again to Fig. 1, the coordinates are oxygen absorbed in cubic centimeters per gram of sample as measured on the mercury-filled manometer on the ordinate, and time in hours on the abscissa. The plotted data was taken from a run in which the polymeric samples were maintained at a temperature of 140° C.

Curve 1 is plotted from absorption data taken from a test conducted on a sample of polyethylene containing 0.1 percent of di-(beta-naphthol)-sulfide and containing no dispersed carbon while curve 2 is plotted from data taken from a test run conducted on a sample of polyethylene containing 0.1 percent by weight of the same inhibitor and in addition containing 3 percent of carbon black. The curve marked "standard" is for a control sample of polyethylene containing no additives. In interpreting curves such as those depicted in Fig. 1 it is generally assumed that the useful properties of polyethylene and other such polymeric materials are not critically affected until the amount of oxygen absorbed by the polymer is of the order of 0.5 percent by weight which is equivalent to about 10 cubic centimeters of absorbed oxygen in the ordinate units.

Examining curve 1 of Fig. 1, it is seen that the antioxidant has effectively prevented oxidation for a period of about 200 hours, i.e., from the origin to about point 1 after which the sharp increase in slope of curve 1 from about point 1 to point 2 indicates increasing autocatalytic breakdown. In general terms, the period from the origin of point 1, lasting for slightly over 200 hours, is referred to as the "induction period." After the induction period has terminated, it is considered that the antioxidant supply is substantially depleted. However, assuming 10 cubic centimeters as the maximum permissible oxygen absorbed, it is seen that the polymer is protected for a period of about 250 hours which is a little longer than the induction period.

In contrast with curve 1, it is seen that the polyethylene sample containing carbon black in addition to the same amount of di-(beta-naphthol)-sulfide, has not absorbed 10 cubic centimeters of oxygen until after a period of approximately 735 hours corresponding with point 3. Oddly enough, the absorption level for the sample containing carbon black is slightly higher than that for the clear sample during the first 200 hours. This may be explained by the adsorption of oxygen by the carbon black itself which would have little or no effect on the polymer. In any event, as is seen by a comparison of curves 1 and 2, the presence of carbon black has increased the lifetime of the polymeric sample of the order of threefold. As will be recognized by those skilled in the art, a protection period of the order of 735 hours on an accelerated test run at 140° C. compares favorably with the best commercially available antioxidant protective materials.

Both curves 1 and 2 compare favorably with the standard curve which latter indicates an exposure of only a few hours for the unprotected polymer before absorption of 10 cubic centimeters of oxygen. Di-(beta-naphthol)-sulfide is therefore an effective antioxidant both in the presence and absence of carbon.

Referring now to Fig. 2 which contains two curves, 3 and 4, which are analogous to curves 1 and 2, and also a "standard" curve, the data represented is taken from an accelerated test run on samples of the same polymeric material in the clear (curve 3) and containing carbon black (curve 4) in which, however, di-(N-phenyl-beta-naphthylamine)-sulfide has been substituted for di-(beta, naphthol)-sulfide. Here it is seen that although the synergistic or booster effect of carbon black is again in evidence, the protective period is somewhat higher and the form of the curve representing the data taken from the black sample (curve 4) is different from the analogous curve of Fig. 1. In the instance of the polyethylene sample containing no carbon black, the induction period running from the origin to point 10 is of the order of 170 hours with a total lifetime assuming a 10 cubic centimeters maximum oxygen absorption of the order of 190 hours (point 11). As in curve 1, Fig. 1, the supply of inhibitor is substantially depleted on the termination of the induction period so that autocatalytic breakdown is rapid from point 10 to the end of the run at point 12 which occurred at about 235 hours. Examining curve 4, it is seen that unlike curve 2 the presence of carbon black has not obliterated a well-defined induction period which, in this instance, runs from the origin to point 13 corresponding with a period of slightly under 220 hours. As in Fig. 1, it is seen that one effect of the addition of carbon black is to decrease the rate of oxidation for an appreciable period after the termination of the induction period for the corresponding clear sample. Because of the decreased rate of oxidation from point 13 to point 14 it is seen that the black sample containing di-(N-phenyl-beta-naphthylamine)-sulfide is extended for a period of about 265 hours. No significance is attached to the change in slope occurring after point 14. Both curves 3 and 4 compare favorably with the standard curve.

Since the inhibitors discussed in connection with Figs. 1 and 2 are not readily available, the methods used for producing these agents are set forth below.

*Preparation of di-(beta-naphthol)-sulfide*

A three-neck round-bottom flask was fitted with a mechanical stirrer of the Herschberg type, an addition funnel and a water-cooled condenser. In the flask were placed 48.1 grams (0.33 mole) of beta-naphthol and 330 cubic centimeters of anhydrous ether. The stirrer was started and when the beta-naphthol had dissolved entirely a cold solution (about 0° C.) of 17 grams (0.16 mole) sulphur dichloride in 45 cubic centimeters of anhydrous ether was added dropwise over a period of 40 minutes. The contents of the reactor and the addition funnel were both at room temperature (24° C.) before the start of the reaction. After about one-third of the sulphur dichloride solution had been added a slight increase in temperature was observed which reached a maximum of 31° C. during the remainder of the addition. After the addition of the sulphur dichloride was completed, stirring was continued for an hour. The contents of the reactor were then transferred to a distillation flask and most of the solvent was removed under reduced pressure. The resultant crystals were recrystallized several times from benzene. The end product was a white crystalline material of a weight of 6.0 grams and having a melting point of 216° C. The melting point data and subsequent analysis indicated this material to be di-(beta-naphthol)-sulfide.

*Preparation of di-(N-phenyl-beta-naphthylamine)-sulfide*

A three-neck round-bottom flask was fitted with a mechanical stirrer of the Herschberg type, an addition funnel and a water-cooled condenser. In the flask were placed 43.8 grams (0.2 mole) of N-phenyl-beta-naphylamine and 400 cubic centimeters of anhydrous ether. The stirrer was started and when the N-phenyl-beta-naphthylamine had dissolved entirely a cold solution (about 0° C.) of 10.3 grams (0.1 mole) of sulphur dichloride in 100 cubic centimeters of anhydrous ether was added dropwise over a period of 40 minutes. The contents of the reactor and the addition funnel were both at room temperature (24° C.) before the start of the reaction. After about one-half of the sulphur dichloride solution had been added, a slight increase in temperature was observed which reached a maximum of 31° C. during the remainder of the addition. After the addition of the sulphur dichloride was completed, stirring was continued for an hour. The contents of the reactor were filtered, the separated crystals were transferred to a distillation flask, and most of the solvent was removed under reduced pressure. The separated crystals were then recrystallized several times from benzene. The end product was a white crystalline material of a weight of 12.1 grams and having a melting point of 184° C. The melting point data and subsequent analysis indicated this material to be di-(N-phenyl-beta-naphthylamine)-sulfide.

As is amply set forth herein, although the invention has been primarily expressed in terms of specific inhibitors and specific amounts of carbon black, in specific saturated hydrocarbon polymeric materials containing tertiary hydrogen atoms, a person skilled in the art will recognize that the principles expressed herein are equally applicable to other inhibitors and polymers within the general formula and ranges of composition all of which have been set forth. For example, although both specific inhibitors reported herein are symmetrical, aromatic monosulfides in which both aromatic moieties are the same, asymmetrical aromatic sulfides work equally well and show the same synergistic effect in the presence of carbon black when incorporated in an essentially saturated hydrocarbon polymer.

What is claimed is:

1. A composition which is stabilized against oxidation comprising from 0.5 percent to 5 percent by weight of carbon particles of a maximum size of 1000 angstroms, from 0.01 percent to 5 percent of a compound of the structure Ar—S—Ar' in which Ar and Ar' are fused ring carbocyclic benzenoid aromatic radicals both of which contain at least one substituent selected from the group consisting of hydroxyl radicals and secondary amine radicals and, further, in which compound the maximum number of carbon atoms in each fused ring moiety including substituents is 30, and an essentially saturated hydrocarbon polymeric material selected from the group consisting of polymers of ethylene, propylene, butene-1, 3-methyl butene-1, 4-methyl pentene-1, 4,4-dimethyl pentene-1, dodecene-1, 3-methyl pentene-1, and mixtures of any of these materials, and in which all weight percents are based on the said composition.

2. The composition of claim 1 in which the polymeric material is a homopolymer.

3. The composition of claim 1 in which the polymeric material is a copolymer.

4. The composition of claim 1 in which the compound is di-(beta-naphthol)-sulfide.

5. The composition of claim 4 in which the polymeric material is polyethylene.

6. The composition of claim 1 in which the compound is di-(N-phenyl-beta-naphthylamine)-sulfide.

7. The composition of claim 6 in which the polymeric material is polyethylene.

8. The composition of claim 1 in which the polymeric material comprises a polymer containing random tertiary hydrogen atoms.

9. The composition of claim 1 in which the polymeric material comprises a polymer containing ordered tertiary hydrogen atoms.

10. A composition which is stabilized against oxidation comprising from 0.01 percent to 5 percent of a compound of the structure Ar—S—Ar' in which Ar and Ar' are fused ring carbocyclic benzenoid aromatic radicals both of which contain at least one substituent selected from the group consisting of hydroxyl radicals and secondary amine radicals and, further, in which compound the maximum number of carbon atoms in each fused ring moiety including substituents is 30, and an essentially saturated hydrocarbon polymeric material selected from the group consisting of polymers of ethylene, propylene, butene-1, 3-methyl butene-1, 4-methyl pentene-1, 4,4-dimethyl pentene-1, dodecene-1, 3-methyl pentene-1, and mixtures of any of these materials, and in which all weight percents are based on the said composition.

References Cited in the file of this patent

UNITED STATES PATENTS

| | | |
|---|---|---|
| 2,160,172 | Rosen | May 30, 1939 |
| 2,431,303 | Billmeyer | Nov. 25, 1947 |
| 2,512,459 | Hamilton | June 20, 1950 |
| 2,727,879 | Vincent | Dec. 20, 1955 |

OTHER REFERENCES

Badger: Structures and Reactions of the Aromatic Compounds, 1954, page 43, Cambridge University Press.

Raff: Polyethylene, 1956, page 402, Interscience Publishers Inc.

Schildknecht: Polymer Processes, February 28, 1956, page 535, Interscience Publishers Inc.